United States Patent [19]

Millot

[11] Patent Number: 4,652,416
[45] Date of Patent: Mar. 24, 1987

[54] FUEL ASSEMBLY FOR A PRESSURIZED WATER NUCLEAR REACTOR

[75] Inventor: Jean-Paul Millot, Elancourt, France

[73] Assignee: Framatome & Cie., Courbevoie, France

[21] Appl. No.: 654,274

[22] Filed: Sep. 25, 1984

[30] Foreign Application Priority Data

Sep. 30, 1983 [FR] France ................... 83 15592

[51] Int. Cl.⁴ .................. G21C 3/32; G21C 7/00
[52] U.S. Cl. ..................... 376/209; 376/173; 376/435
[58] Field of Search ............. 376/434, 173, 435, 209

[56] References Cited

U.S. PATENT DOCUMENTS

| | | | |
|---|---|---|---|
| 3,212,991 | 10/1965 | Brynsvald et al. | 376/434 |
| 3,351,532 | 11/1967 | Raab, Jr. et al. | 376/173 |
| 3,629,066 | 12/1971 | Andersson et al. | 376/434 |
| 3,933,582 | 1/1976 | MacNabb | 376/435 |
| 3,957,575 | 5/1976 | Fauth, Jr. et al. | 376/173 |
| 4,059,484 | 11/1977 | Bupp et al. | 376/435 |
| 4,251,321 | 2/1981 | Crowther | 376/435 |
| 4,324,618 | 4/1982 | Schluderberg | 376/434 |
| 4,495,136 | 1/1985 | Camden, Jr. et al. | 376/435 |

FOREIGN PATENT DOCUMENTS 0021429 6/1983 European Pat. Off. ............ 376/435

Primary Examiner—Harvey E. Behrend
Attorney, Agent, or Firm—Pollock, Vande Sande & Priddy

[57] ABSTRACT

Fuel assembly for a pressurized water nuclear reactor, comprising a peripheral zone (1) consisting of a first group of rods (2) containing mainly enriched uranium oxide and a central zone (4) consisting of a second group of rods (5) containing mainly plutonium or uranium depleted in fissile uranium. The rods of the first zone (1) are spaced sufficiently so that the neutrons are slowed down to the thermal region. The rods of the second zone (4) are spaced by a distance which is appreciably smaller so that the neutrons produced in this zone (4) are in the high-energy region. The invention applies, in particular, to nuclear reactors with spectral shift.

5 Claims, 4 Drawing Figures

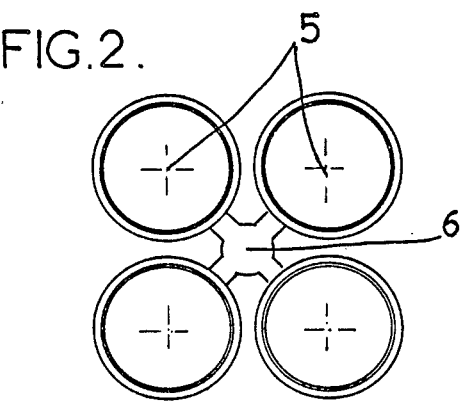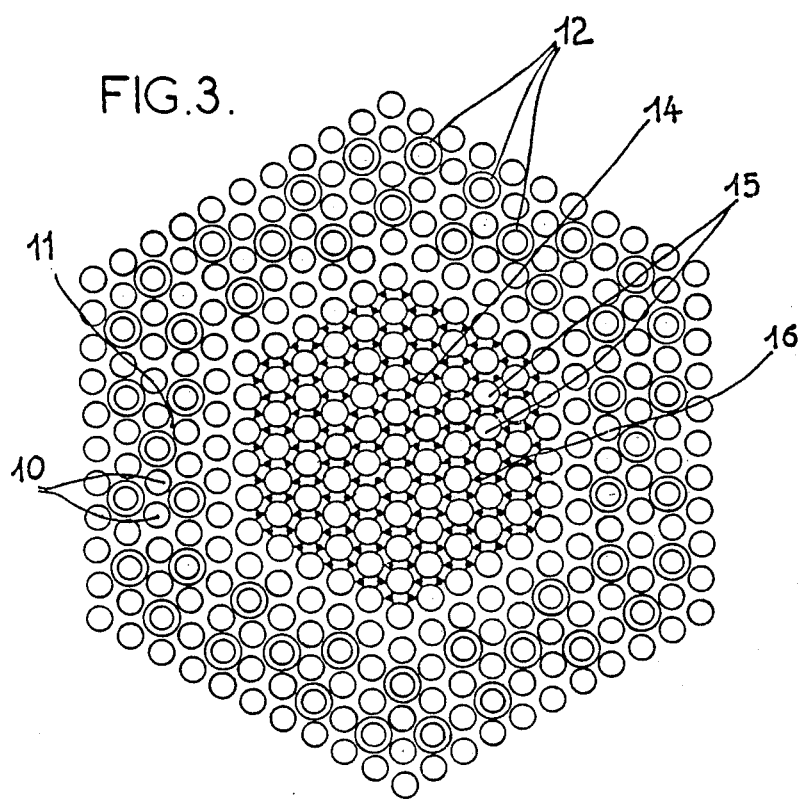

FUEL ASSEMBLY FOR A PRESSURIZED WATER NUCLEAR REACTOR

FIELD OF THE INVENTION

The invention relates to a fuel assembly for a pressurized water nuclear reactor.

Each of the assemblies intended for pressurized water nuclear reactors generally consists of a cluster of parallel fuel rods arranged in the longitudinal direction of the assembly and held spaced out by spacers, in the transverse directions of the assembly. The spaces provided between the rods permit the circulation of the cooling water in which the reactor core is immersed and the formation of a layer of moderating water around each of the rods.

Pressurized water nuclear reactors consume large quantities of natural uranium and in addition have a relatively low yield since only a small part of this uranium contained in the assemblies is really employed for the production of energy.

Reprocessing of the materials in irradiated assemblies makes it possible, however, to recover plutonium which may be employed to form a part of the load of converter reactors. However, to date these converter reactors have not undergone major industrial and commercial development.

PRIOR ART

It has therefore been proposed to employ the recovered plutonium to form a part of the fuel introduced into the rods forming the reactor core assemblies. This process does not make it possible to introduce large quantities of plutonium into the reactor load and furthermore this plutonium, since the energy spectrum of the neutrons in the core of a pressurized water nuclear reactor is thermal, is not employed in a satisfactory manner. In particular, this plutonium is degraded by the formation of non-fissile isotopes from the fissile isotopes which it contains.

This disadvantage can be cured in a nuclear reactor core of a heterogeneous structure in which fuel assemblies of different types are juxtaposed, some of the assemblies containing rods of uranium oxide separated by a normal distance, and the other assemblies containing rods filled with plutonium and separated by a distance which is much less than the distance separating the rods of enriched uranium. A hardening of the neutron spectrum is thus produced in the assemblies containing the plutonium rods which are surrounded by a thin layer of moderating water. This type of core for a nuclear reactor is described in copending U.S. patent application Ser. No. 653,804 (Millot) assignned to the same assignee as the present application.

This leads, however, to the use of assemblies of different types in the reactor.

More generally, and without reference to the use of recovered plutonium, it has been proposed, in order to improve the yield of pressurized water nuclear reactors, to shift the neutron spectrum of these reactors towards the high energies and to combine with the fuel assemblies a proportion of fertile materials such as depleted uranium. For these reactors, it is necessary to provide undermoderated fuel assemblies where the fuel rods are not widely separated. It is also necessary to employ at least two types of assemblies, fissile assemblies and fertile assemblies. Finally, if it is desired to change from a reaction operation of the undermoderated type with a production of fissile material to a normal operation, it is necessary to change completely the reactor load.

Reactors with a spectral shift control have also been proposed, and are described for example in French Specifications Nos. 2,535,509 and 2,535,508 where a part of the guide tubes of the fuel assemblies can receive during the first part of the operating cycle of the reactor, rods of depleted uranium which reduce the quantity of moderating water in the assemblies and which insert into the latter a material absorbing low-energy neutrons and capable of being converted into fissile material. Such reactors with spectral shift control permit reuse of the recovered plutonium, provided that under-moderated assemblies containing plutonium are introduced in juxtaposition with the spectral shift assemblies. Nevertheless, this can complicate, the reactor reloading operations and requires a more restrictive management of the various assemblies forming the core.

SUMMARY OF THE INVENTION

The object of the invention is therefore to offer a fuel assembly for a pressurized water nuclear reactor consisting of a cluster of parallel fuel rods arranged in the longitudinal direction of the assembly and spaced out in the transverse direction of the assembly to permit the circulation of the cooling water and the formation of a layer of moderating water around the rods, this fuel assembly being capable of simplifying the design of the core of undermoderated reactors and of employing recovered plutonium under good conditions, in particular in reactors with spectral shift control.

To this end, the fuel assembly comprises:
- a peripheral zone consisting of a first group of rods containing mainly uranium oxide enriched in fissile uranium so as to emit neutrons and to maintain the neutron reaction, spaced so that the layer of moderating water is sufficient to bring the neutrons into the thermal region, and
- a central zone consisting of a second group of rods containing mainly plutonium and/or uranium depleted in fissile uranium and spaced by a distance which is appreciably smaller than the distance separating the rods in the peripheral zone.

Preferably, this fuel assembly incorporates a group of guide tubes in its peripheral zone which is capable of receiving spectral shift rods.

BRIEF DESCRIPTION OF THE DRAWINGS

Two embodiments of a fuel assembly according to the invention will now be described by way of non-limiting examples, with reference to the attached figures.

FIG. 2 is a part view, on a larger scale, of a part of the central zone of the assembly shown in FIG. 1.

FIG. 3 is a transverse cross-section of the cluster forming a fuel assembly according to the invention, with a hexagonal cross-section.

DETAILED DESCRIPTION

Figure 1:
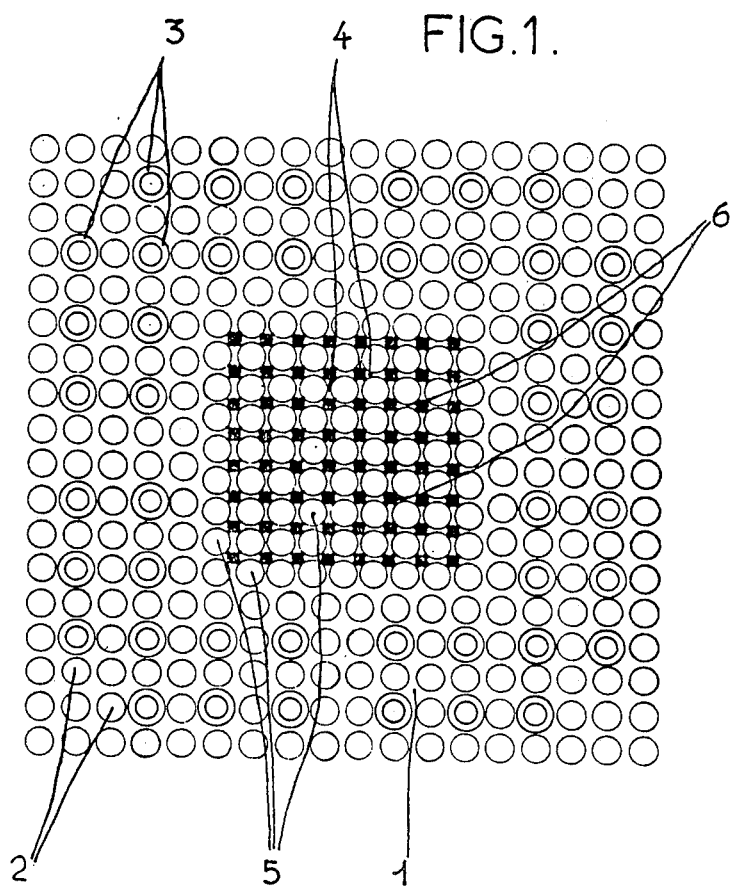
FIG. 1 is a transverse cross-section of the cluster forming a fuel assembly according to the invention, with a square cross-section.
Figure 4:
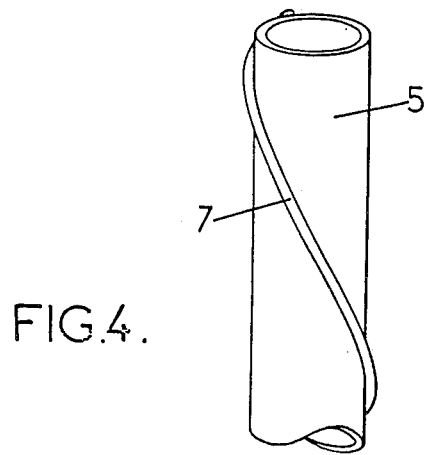
FIG. 4 is a schematic representation of a portion of a fuel rod provided with a spacing wire.

FIG. 1 shows the transverse cross section of a cluster forming a fuel assembly with a square cross-section in which the fuel rods situated in the peripheral part 1 of the assembly are arranged in a square-mesh array. The array is an 18×18 grid where the rods 2 are at a certain distance from each other by virtue of spacer grids. Some locations in the array are occupied by guide tubes 3 (indicated by double lines) ensuring both the stiffening of the assembly and the guiding of rods therein.

The central part 4 of the assembly consists of a second array of rods 5 where the rods are held with a spacing which is markedly smaller than the spacing of the rods 2 in the peripheral part 1 by profiled longitudinal spacers 6. The central part 4 of the assembly comprises a hundred fuel rods arranged in ten rows of ten rods. This cluster 4 forming the central part can be held as a group by the transverse spacer grids for supporting the rods and the guide tubes of the peripheral part.

The rods 2 of the peripheral part consist of a cladding tube filled with pellets of uranium oxide enriched in fissile uranium while the rods 5 of the central part 4 consist of cladding tubes filled with recovered plutonium.

The whole assembly comprises two hundred and sixteen fissile rods 2 containing enriched uranium, forty four guide tubes 3 permitting the introduction of rods into the assembly and one hundred plutonium rods 5 forming the undermoderated part of the assembly.

The hundred rods 5 are held at a small distance from each other by eighty-one profiled spacers 6.

FIG. 2 shows the arrangement of four rods 5 containing plutonium around a profiled spacer 6 maintaining a separation of 9.75 mm between the axes of these rods whose external diameter is 8.65 mm. Inside the outer can of the rods 5, the fuel material is arranged with some clearance permitting its expansion.

The group of 44 guide tubes or a number of these guide tubes can receive rods of depleted uranium, during the first part of the operating cycle of the reactor to harden the neutron spectrum of the reactor and to increase the quantity of fertile material introduced which is capable of being transformed into fissile material. The neutrons produced by the peripheral part of the assemblies containing the enriched uranium cause the fission of the fissile isotopes of plutonium present in the central part 4 of the assembly. The neutrons produced by these fissions are high-energy neutrons since they are produced in an undermoderated zone of the assembly. The degradation of the plutonium by formation of non-fissile isotopes, which takes place in the case of a flux of low-energy neutrons, is thus avoided.

During the second part of the operating cycle of the reactor, the fissile material formed in the assembly is employed, thereby making it possible to increase the yield of the fuel initially introduced in the reactor charge.

To form the reactor charge, identical assemblies are juxtaposed, each comprising a peripheral zone comprising rods of enriched uranium and guide tubes and a central part comprising plutonium rods.

For some of the core assemblies, all of the guide tubes receive spectral shift rods and for other core assemblies, some of the guide tubes receive spectral shift rods and another part receives reactor reactivity control rods for power steering. However, the assemblies themselves remain identical whether they receive only spectral shift rods or both spectral shift rods and control rods.

FIG. 3 shows an alternative an embodiment of an assembly according to the invention, this assembly having a hexagonal cross-section. The peripheral part of the assembly consists of rods 10 containing uranium oxide enriched in fissile uranium and forty eight guide tubes 12 intended to receive rods of depleted uranium for spectral shift control and/or reactor control rods.

The central part 14 of the assembly consists of plutonium rods 15 held by profiled spacers 16 with a spacing which is markedly smaller than the spacing of the rods 10. The zone 14 of the assembly thus forms the undermoderated portion of this assembly in which a hardening of the neutron spectrum is obtained by a reduction of the moderating water layers.

It is possible to further reduce the moderating water layer by increasing the diameter of the rods in the central zone.

The manner of operation of the assembly shown in FIG. 3 is completely identical to the manner of operation of the assembly shown in FIGS. 1 and 2, when this assembly is introduced into a nuclear reactor core where it forms a part of the load. All the other core assemblies are, moreover, identical to the assembly shown in FIG. 3. Such an assembly is generally enclosed in a prismatic casing with a hexagonal cross-section, e.g., such as described in applicant's French Specification Nos. 2,511,174 and 2,517,866.

The invention is not limited to the embodiments which have just been described; on the contrary, it comprises all the alternative forms.

Thus it is possible to introduce into the rods of the peripheral zone a quantity of fertile material capable of being transformed into fissile material under the effect of high-energy neutrons during the first part of the operating cycle of the reactor.

The fuel assembly according to the invention can serve not only for recycling recovered plutonium in watercooled nuclear reactors but also as an undermoderated assembly containing both fissile material and fertile material. The rods 5 or 15 of the central part of the assembly consist in this case of fertile material such as depleted uranium instead of recovered plutonium. In this case, the fuel assembly according to the invention has the advantage of permitting the load of an undermoderated reactor to consist of a single type of assembly.

By providing in the peripheral part guide tubes capable of receiving spectral shift rods, the advantages of the spectral shift reactors and the undermoderated reactors are combined.

The rods of the central part of the assembly can be held spaced by a small distance from each other by wires 7 wound in a spiral over the outer surface of these rods, instead of profiled spacers as described.

Finally, the fuel assembly according to the invention can be applied to any water-cooled nuclear reactors where it is desired to produce a heterogeneous structure of the reactor core, with zones having different moderation factors.

I claim:

1. In a pressurized water nuclear reactor having a plurality of identical fuel assemblies traversed by cooling water, each of said fuel assemblies comprising a cluster of parallel fuel rods arranged in a longitudinal direction of said assembly and held spaced in the transverse direction of said assembly, said cluster of fuel rods consisting of:
    (a) a plurality of first cylindrical fuel rods distributed according to a regular pattern in a peripheral zone of said cluster and initially containing only enriched uranium; and (b) a plurality of second cylindrical fuel rods distributed according to a regular pattern in a central zone of said cluster and initially containing only recovered plutonium, the diameter and spacing of said second fuel rods being so proportioned that the water between said second fuel rods maintains the neutron energy spectrum in said central zone in an energy range higher than thermal;

(c) guide tubes being substituted for some of said first fuel rods and distributed within said regular pattern, the number of said guide tubes and the diameter and spacing of said first fuel rods being so proportioned that the water between said first fuel rods and within said guide tubes provides neutron moderation substantially in the thermal energy range.

2. In a nuclear reactor having a plurality of identical fuel assemblies traversed by cooling water, spectral shift rods movable into and out of some at least of said fuel assemblies, and control rods, each of said fuel assemblies comprising a cluster of parallel fuel rods arranged in a longitudinal direction of said assembly and held spaced in the transverse direction of said assembly, said cluster of fuel rods consisting of:

(a) a plurality of first cylindrical fuel rods distributed according to a regular pattern in a peripheral zone of said cluster and initially containing only fissile uranium enriched uranium oxide; and (b) a plurality of second cylindrical fuel rods distributed according to a regular pattern in a central zone of said cluster and initially containing only recovered plutonium, the diameter and spacing of said second fuel rods being so proportioned that water between said second fuel rods maintains the neutron energy spectrum in said central zone in an energy range higher than thermal;

(c) guide tubes being substituted for some of said first fuel rods and distributed within said regular pattern, each for receiving one of said control rods and spectral shift rods, the number of said guides tubes and the diameter and spacing of said first fuel rods being so proportioned that water between said first fuel rods and within said guide tubes provides neutron moderation into the thermal energy range.

3. A pressurized water reactor as claimed in claim 1, wherein all of said fuel elements have the same diameter and said second fuel rods are located according to a pattern having a spacing between the axes of adjacent fuel rods which is lower in said central zone than in said peripheral zone.

4. A fuel assembly as claimed in any one of claims 1 to 3 wherein the rods (5, 15) of the central zone (4, 14) of the assembly are kept spaced from each other by longitudinal profiled spacers (6).

5. A fuel assembly as claimed in any one of claims 1 to 3 wherein the rods (5, 15) of the central part (4, 14) of the assembly are held spaced from each other by wires wound in a spiral over the outer surface of these rods.

* * * * *